(12) United States Patent
Kim et al.

(10) Patent No.: US 12,324,542 B2
(45) Date of Patent: Jun. 10, 2025

(54) METHOD FOR DISTINGUISHING CONTAINER BODY OF BLENDER, AND BLENDER

(71) Applicant: LG Electronics Inc., Seoul (KR)

(72) Inventors: Donghyun Kim, Seoul (KR); Seungje Park, Seoul (KR); Jea Shik Heo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 874 days.

(21) Appl. No.: 17/612,828

(22) PCT Filed: Aug. 6, 2020

(86) PCT No.: PCT/KR2020/010378
§ 371 (c)(1),
(2) Date: Nov. 19, 2021

(87) PCT Pub. No.: WO2021/029610
PCT Pub. Date: Feb. 18, 2021

(65) Prior Publication Data
US 2022/0218155 A1 Jul. 14, 2022

(30) Foreign Application Priority Data

Aug. 13, 2019 (KR) .................. 10-2019-0098863

(51) Int. Cl.
*A47J 43/07* (2006.01)
*A47J 43/046* (2006.01)
*A47J 43/08* (2006.01)

(52) U.S. Cl.
CPC ......... *A47J 43/0777* (2013.01); *A47J 43/046* (2013.01); *A47J 43/085* (2013.01)

(58) Field of Classification Search
CPC .............. A47J 43/0766; A47J 43/0777; B01F 35/6052
See application file for complete search history.

(56) References Cited

U.S. PATENT DOCUMENTS 6,320,169 B1 * 11/2001 Clothier ............. G06K 19/0723
340/572.1
2010/0147832 A1 * 6/2010 Barker, III ............. H05B 6/062
219/626

(Continued)

FOREIGN PATENT DOCUMENTS

DE 3733108 C1 * 9/1987
EP 3017737 B1 6/2017

(Continued)

*Primary Examiner* — Marc C Howell
(74) *Attorney, Agent, or Firm* — Bryan Cave Leighton Paisner LLP (57) ABSTRACT

Proposed is a method for distinguishing a container body seated on a main body of a blender, and the blender. The blender according to the present disclosure has arranged at the lower part of the container body a light source module for transmitting a light signal, and has arranged at the upper part of the main body a light reception module for receiving the light signal such that, when the container body is seated on the main body, power is supplied to the light source module via inductive coupling of a first induction coil arranged on the main body and a second induction coil arranged on the container body, the light source module transmits the light signal corresponding to the container body, the light reception module receives the light signal, and the container body on the main body can thereby be distinguished.

19 Claims, 10 Drawing Sheets

(56) References Cited

U.S. PATENT DOCUMENTS

| | | |
|---|---|---|
| 2013/0139704 A1 | 6/2013 | Schilling et al. |
| 2015/0265983 A1* | 9/2015 | Fleming .............. B01F 35/2131 |
| | | 366/206 |
| 2018/0020875 A1* | 1/2018 | Kolar .................. A47J 43/0777 |
| | | 366/279 |
| 2018/0255975 A1* | 9/2018 | Kolar ....................... H04B 5/72 |
| 2022/0175194 A1* | 6/2022 | Antkowiak ......... A47J 43/0777 |

FOREIGN PATENT DOCUMENTS

| | | |
|---|---|---|
| FR | 2791546 A1 | 10/2000 |
| JP | H05184471 A | 2/1999 |
| KR | 10-0796634 B1 | 1/2008 |
| WO | 2018/087030 A1 | 5/2018 |

* cited by examiner

FIG. 11

METHOD FOR DISTINGUISHING CONTAINER BODY OF BLENDER, AND BLENDER

This application is the National Stage filing under 35 U.S.C. 371 of International Application No. PCT/KR2020/010378 filed on Aug. 6, 2020, which claims priority to Korean Patent Application No. 10-2019-0098863 filed on Aug. 13, 2019, the contents of which are all hereby incorporated by reference herein in their entirety.

TECHNICAL FIELD

The present disclosure relates to a method for distinguishing a container body of a blender, and to the blender.

BACKGROUND ART

In general, a blender is a home appliance used to finely chop or crush food contained in a container body with a rotating blade powered by a motor, and is commonly referred to as a mixer.

A blender has a container body seated on the upper surface of a main body, and when the container body is seated, a blade inside the container body is connected to a rotating shaft of a motor and becomes rotatable.

A user may put food into the container body through the opening of the container body, close a container lid, and operate the main body to drive the motor, rotate the blade, and crush the food.

Recently, a blender whose multiple containers with different purposes can be used in one main body and whose main body operates according to the purpose of each container body is being developed.

In other words, a blender that provides multiple containers distinguished based on food ingredients or purpose of use, and that allows a user to choose and use a container body corresponding to the purpose by placing it on one main body is under development.

However, the main body of the blender may not recognize which type of a container body is seated when a user places different types of containers on the main body, so the user himself or herself has to distinguish the container body and enter the type of the container body, which is troublesome.

In the same context, there is a problem that the main body of the blender may not decide which mode of operation should be operated in since the main body cannot recognize the container body being seated, and the user himself or herself has to enter the operation mode suitable for the type of the container.

For that reason, technological development is required in the field for a blender that allows a user to selectively use multiple containers with one main body and distinguishes the container body being seated on the main body.

DISCLOSURE

Technical Problem

An objective of the present disclosure is to provide a method for distinguishing a container body of a blender and the blender, which enables a user to selectively use multiple containers in one main body, and with which the container body being seated on the main body can be distinguished.

Another objective of the present disclosure is to provide a method for distinguishing a container body of a blender and the blender, with which the container body being seated on the main body can be distinguished and thereby making the main body to operate in an operation mode suitable for the purpose of the container body.

Another objective of the present disclosure is to provide a method for distinguishing a container body of a blender and the blender, of which the first induction coil is arranged on the main body and the second induction coil is arranged on the container body, and with which the container body being seated on the main body can be distinguished by the power generated via inductive coupling between the first and second induction coils.

Another objective of the present disclosure is to provide a method for distinguishing a container body of a blender and the blender, which makes it possible to accurately distinguish a container body with low power.

Objectives of the present disclosure are not limited to the above-mentioned objectives and other unmentioned objectives can be clearly understood from the following description by a person skilled in the art to which the present disclosure pertains.

Technical Solution

According to an embodiment, a blender has arranged at the lower part of a container body a light source module for transmitting a light signal, and has arranged at the upper part of a main body a light reception module for receiving the light signal such that, when the container body is seated on the main body, the light source module transmits the light signal corresponding to the container body and the main body may distinguish the container body by using the light signal received by the light reception module.

According to another embodiment, the first induction coil is arranged at the upper part of the main body and the second induction coil is arranged at the lower part of the container body, and when the container body is seated on the main body, a voltage induced in the second induction coil via inductive coupling between the first and second induction coils is supplied to the light source module, enabling transmission of the light signal.

According to yet another embodiment, in a blender of which multiple containers may be used in one main body interchangeably, a frequency of a light signal is set differently for each container body, and when a container body is seated on the main body, the main body may distinguish the container body by reading the frequency of the received light signal.

To this end, a light source module of the container body, according to yet another embodiment, may modulate the frequency of the light signal corresponding to the container body, turn the light on and off according to the modulated frequency, and transmit the light signal, while the main body may distinguish the container body corresponding to the frequency upon receiving the light signal.

According to yet another embodiment, a seating detection part provided on the main body may detect a magnet attached to the container body, thereby detecting that the container body is seated.

According to yet another embodiment, when the container body is seated on the main body, the first induction coil arranged at the upper part of the main body and the second induction coil arranged at the lower part of the container body are placed parallel to each other with the same center point, making inductive coupling between the first and second induction coils effective.

According to yet another embodiment, the light source module includes a light source to emit light and the light reception module includes a semiconductor sensor to receive the light emitted from the light source, facilitating smooth transmission and reception of the light signal.

According to yet another embodiment, when the container body on the main body is distinguished by the light signal, the main body operates in an operation mode corresponding to the container body, meaning the desired action is automatically executed without user input of the operation mode.

Advantageous Effects

The method for distinguishing a container body of a blender, and the blender, according to embodiments of the present disclosure, have advantages described below.

According to one embodiment of the present disclosure, a user can avoid the trouble of distinguishing and entering the type and purpose of a container body since a main body may automatically distinguish the container body seated on the main body.

According to another embodiment of the present disclosure, a user can avoid the trouble of selecting operation mode of the main body according to the purpose of a seated container body since the main body can automatically distinguish the container body seated on the main body.

According to a further embodiment of the present disclosure, when the container body is seated on the main body, a light signal is transmitted to distinguish the type of the container body by using the power generated via inductive coupling between an induction coil arranged on the main body and an induction coil arranged on the container body, thus, it is able to distinguish the container body with low power.

According to still another embodiment of the present disclosure, when the container body is seated on the main body, a light signal is transmitted from the container body and received by the main body, enabling the main body to automatically distinguish the container body with this simple process.

MODE FOR INVENTION

Advantages and features of the present disclosure and a method of achieving the same should become clear with embodiments described in detail below with reference to the accompanying drawings. However, the present disclosure is not limited to the embodiments disclosed below and may be realized in various other forms. The present embodiments make the disclosure complete and are provided to completely inform a person skilled in the art to which the present disclosure pertains of the scope of the disclosure. The present disclosure is defined only by the scope of the claims. Like reference numerals refer to like elements throughout.

Hereinafter, the present disclosure will be described in detail with reference to the accompanying drawings.

Figure 1:
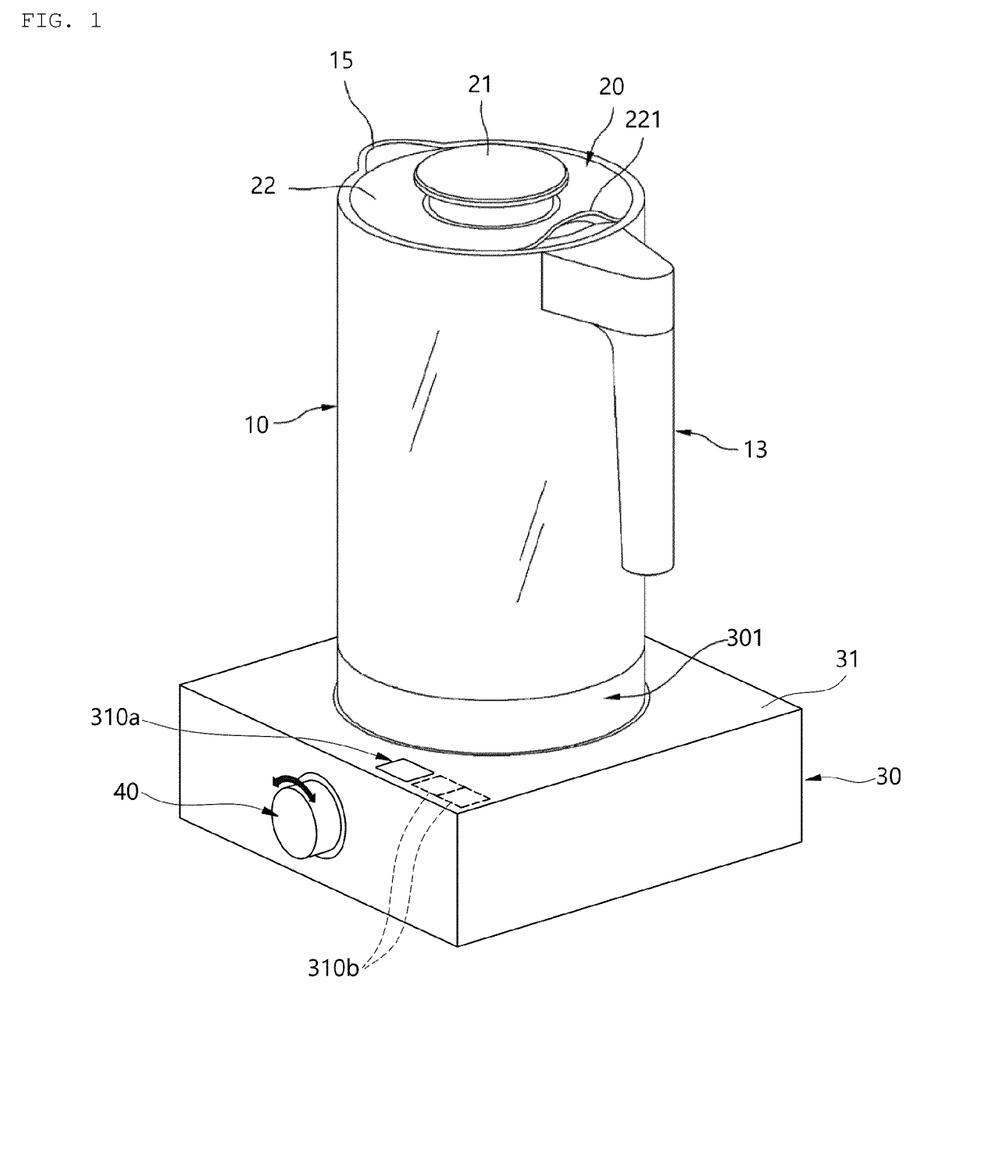
FIG. 1 is an exterior perspective view of a blender according to embodiments of the disclosure.
Figure 2:
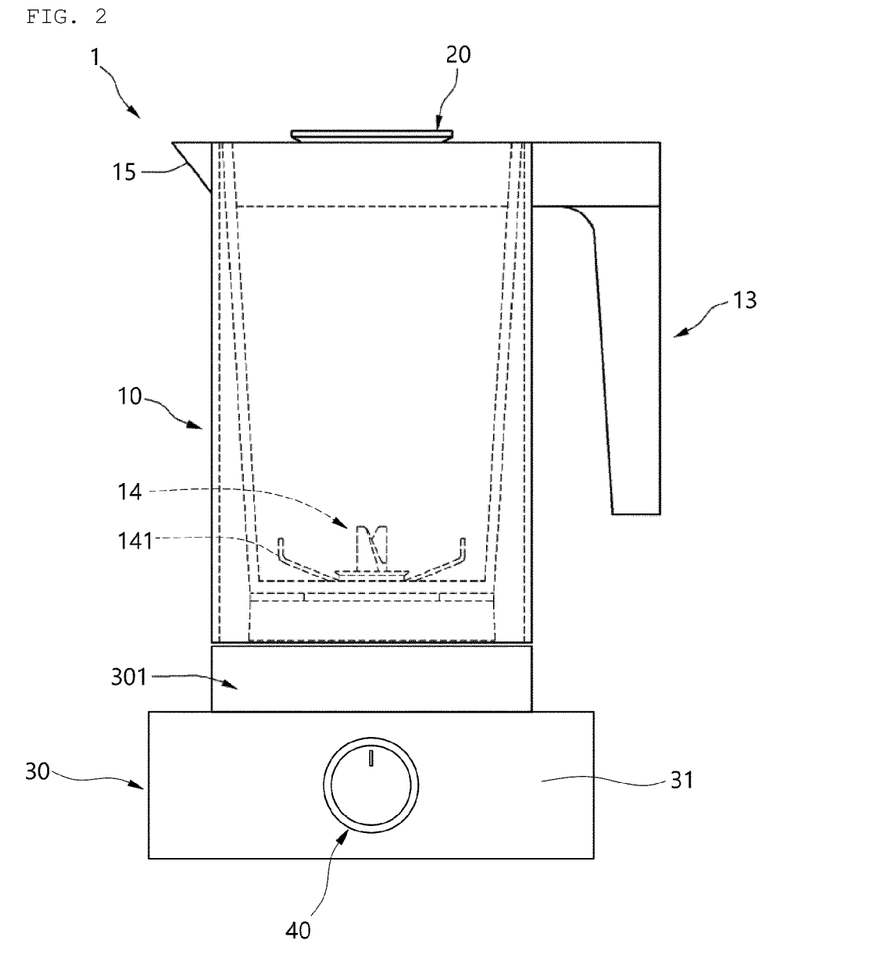
FIG. 2 is an elevational view of the blender.

FIG. 1 is an exterior perspective view of a blender according to embodiments of the disclosure, and FIG. 2 is an elevational view of the blender.

Referring to FIGS. 1 and 2, the blender 1 according to embodiments of the disclosure may be configured to include a main body 30 placed on the floor and a container body 10 seated on top of the main body 30.

Inside the main body 30, a number of electrical devices and components including a motor and a control PCB module to operate the blender 1 may be arranged.

In the main body 30, a manipulation part 40, 310b to manipulate the operation of the blender 1 and an indication part 310a to indicate the operation status of the blender 1 may be provided.

The main body 30 may be formed in a hexahedral shape as a whole, and on the top a seating part 301 may be formed for the container body 10 to be seated. The seating part 301 may be configured for the container body 10 to be detachable in the vertical direction.

The exterior of the main body 30 may be formed by a case 31 made of metal materials or materials having a metallic texture, and the case 31 may be formed in a hexahedral shape with an open bottom.

Inside the case 31, a space may be provided for mounting a motor (see FIGS. 3 and 51 of FIG. 5) and a control PCB module, etc.

On the front side of the main body 30, a knob 40 may be provided for a user to set the operation of the blender 1. The knob 40 is configured to protrude from the front side of the main body 30, and actions of the blender 1 may be manipulated and set by a rotating operation of the knob 40.

On the upper surface of the main body 30, the indication part 310a may be provided to indicate the operation status of the blender 1. The indication part 310a may include at least one display device.

On the upper surface of the main body 30, the manipulation part 40, 310b may be provided to manipulate starting and stopping actions of the blender 1. To manipulate the blender 1, the manipulation part 40, 310b may include, for example, at least one of the knob 40 and a touch module (not shown).

On the upper surface of the main body 30, the seating part 301 may be formed. The seating part 301 may protrude from the upper side of the main body 30, and a part of the seating part 301 may be inserted into the lower surface of the container body 10 to securely support the container body 10.

When the container body 10 is seated in the seating part 301, a motor 51 inside the main body 30 and a blade module 14 inside the container body 10 are joined to each other, then a rotational force may be transmitted from the motor 51 to the blade module 14.

The exterior of the seating part 301 may be formed of the same material as the case 31. For example, the seating part 301 may be formed of metal materials or materials having a metallic texture to have a sense of unity with the exterior of the main body 30.

The motor 51 is for rotation of the blade module installed inside the container body 10, that is, the blade module 14 may be rotated at high speed by driving of the motor 51.

The rotation speed of the motor 51 may be controlled by the operation of the knob 40, which makes it possible to adjust the rotation speed of the blade module 14.

At the top of the container body 10 a pouring lip 15 to pour out crushed food may protrude, and on one side facing the pouring lip 15, a handle 13 may be formed to protrude.

The handle 13 protrudes outward from the top of the container body 10 and extends downward, allowing a user may lift or move the container body 10. The protruding end of the handle 13 may be located on the same line with the side end of the main body 30.

On the upper surface of the container body 10, a lid 20 may be inserted or removed. A user may grab a lid handle 21 to insert the lid 20 in or remove the lid 20 from the container body 10, thereby opening and closing an upper-surface opening of the container body 10.

By closing (this is called "the closure of a container lid") or opening (this is called "the opening of a container lid") the upper-surface opening of the container body 10 with the lid 20, the upper-surface opening of the container body 10 may be covered and opened.

Figure 3:
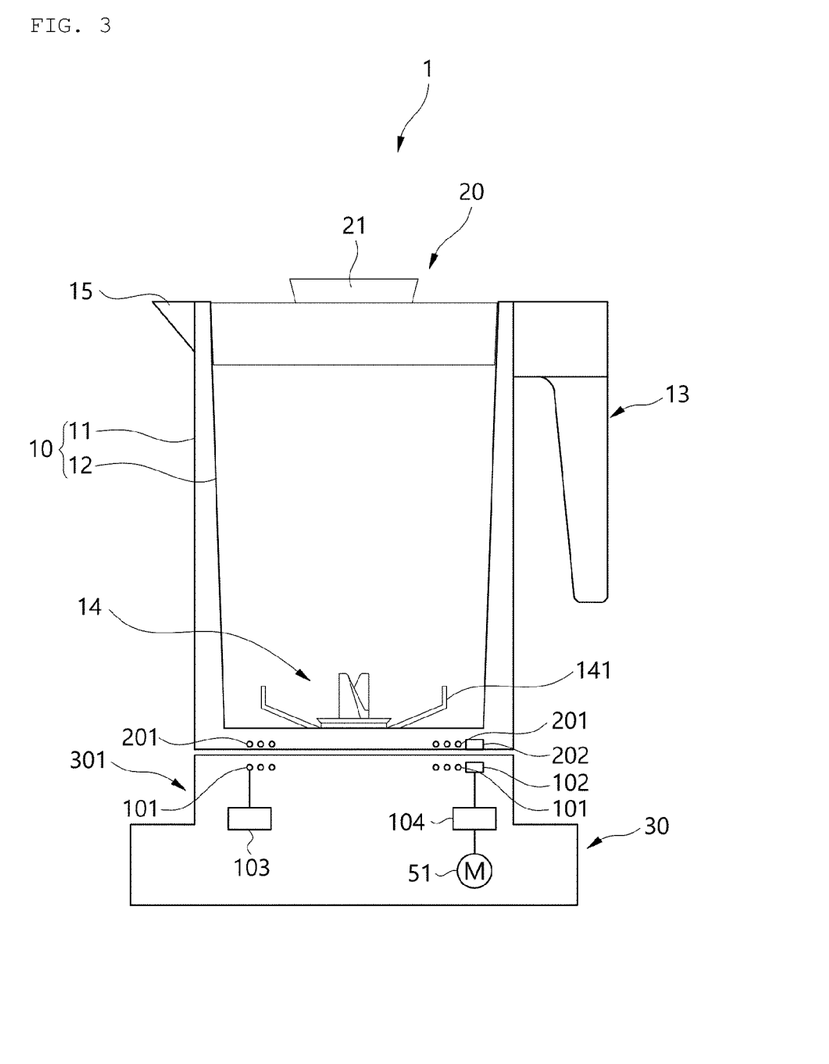
FIG. 3 is a partial sectional view illustrating a part of blender configuration according to an embodiment of the disclosure.
Figure 4:
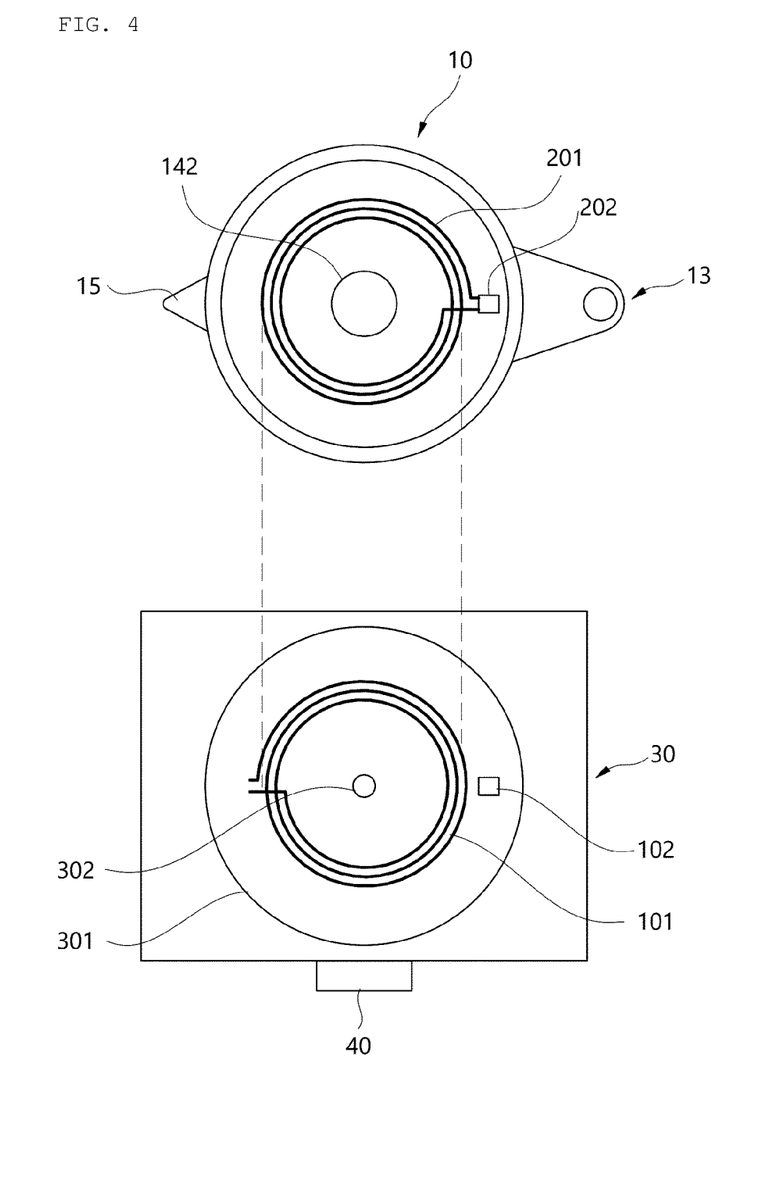
FIG. 4 is a bottom view of a container body and a top view of a main body of the blender of FIG. 3.

FIG. 3 is a partial sectional view illustrating a part of blender configuration according to an embodiment of the disclosure, and FIG. 4 is a bottom view of a container body and a top view of a main body of the blender of FIG. 3.

Referring to FIGS. 3 and 4, in the blender 1 of the embodiment, the first induction coil 101 may be installed at the upper part of the main body 30. The first induction coil 101 may be embodied in a form in which a conductor is wound spirally multiple times on the same plane.

The first induction coil 101, according to the embodiment, may be disposed in a form in which a conductor is spirally wound multiple times around a motor-side connection part 302 at the upper central part of the main body 30, in a ring shape as a whole.

At the upper part of the main body 30, a light reception module 102 for receiving a light signal transmitted from outside may be installed. The light reception module 102 may be arranged to be exposed to the outside to receive the light signal. The light reception module 102 may be protected by a cover member (not shown) made of a light-transmitting material.

The main body 30 may include a power supply part 103 inside. The power supply part 103 may apply current to the first induction coil 101. When the current is applied to the first induction coil 101, a magnetic field may be created in the first induction coil 101.

The power supply part 103 may change the strength of the current applied to the first induction coil 101, and by the change of the current strength, the magnetic field may be changed in the first induction coil 101. The power supply part 103 may be mounted on a PCB substrate (not shown).

The main body 30 may include a controller 104 inside. The controller 104 may be connected to the motor 51 which is for rotating the blade module 14.

The controller 104 may drive the motor 51 when a light signal is received by the light reception module 102. The controller 104 may be mounted on a PCB substrate.

In addition, the controller 104 may distinguish the container body 10 seated on the main body 30 by analyzing the light signal received by the light reception module 102, and may drive the motor 51 in an operation mode corresponding to the container body 10. Here, distinguishing the container body 10 may mean to distinguish the type suitable for the purpose of the container body 10, thus the rotation speed of the motor 51 may be adjusted according to the purpose of the container body 10.

At the lower part of the container body 10, the second induction coil 201 may be installed. The second induction coil 201 may be arranged in a form in which a conductor is wound spirally multiple times on the same plane.

The first induction coil 101, according to the embodiment, may be disposed in a form in which a conductor is spirally wound multiple times in an outer part around a blade-side connection part 142 at the lower central part of the container body 10, in a ring shape as a whole.

At the lower part of the container body 10, the light source module 202 for receiving a light signal may be installed. The light source module 202 may be arranged to be exposed to the outside to transmit the light signal. The light source module 202 may be protected by a cover member (not shown) made of a light-transmitting material.

As in the illustrated embodiments, when the container body 10 is seated on the main body 30, the first induction coil 101 in the main body 30 and the second induction coil 201 in the container body 10 may be arranged at predetermined intervals at positions corresponding to each other.

When the container body 10 is seated on the main body 30, the first induction coil 101 and the second induction coil 201 may be respectively disposed to face and parallel to each other with the same center point.

The first induction coil 101 and the second induction coil 201 may be selectively inductively coupled under certain conditions.

When the strength of the current applied to the first induction coil 101 changes by the power supply part 103, the magnetic field in the first induction coil 101 may be changed and magnetic flux passing through the second induction coil 201 may be changed by the inductive coupling between the first induction coil 101 and the second induction coil 201, thus an induced electromotive force may be produced in the second induction coil 201.

The induced electromotive force in the second induction coil 201 may be applied to the light source module 202. The light source module 202 may transmit the light signal by using the power applied from the second induction coil 201. The transmitted light signal may be received by the light reception module 102.

The light source module 202 and the light reception module 102 may be arranged facing each other for smooth mutual transmission and reception of the light signal.

The light source module 202, according to the embodiment, may include a light source that emits light, and the light reception module 102 may include a light sensor that detects the light emitted. The light source may include a light emitting diode (LED) and the light sensor may include a semiconductor sensor that can receive light. The semiconductor sensor may be implemented as, for example, a photodiode, a phototransistor, or the like.

Although not shown in the drawings, the main body 30 may have a seating detection module to detect whether the container body 10 is seated. The seating detection module may detect whether the container body 10 is seated by detecting a magnet installed in the lower part of the container body 10 when the container body 10 is seated on the main body 30.

The seating detection module may include a reed switch, and when the magnet approaches the reed switch, the reed switch is turned on and detects the approach of the magnet, thereby detecting the seating of the container body 10.

When a voltage is induced in the second induction coil 201, the voltage may be applied to the light source module 202. Here, a conversion module may be included to convert an alternating current (AC) voltage generated in the second induction coil 201 to a direct current (DC) voltage required by the light source module 202. The conversion module will be explained in detail below.

The light source module 202 may modulate a frequency of a light signal and transmit the frequency-modulated light signal. The frequency modulation may be implemented differently for each container body 10.

According to the embodiment, it is able to analyze the frequency-modulated light signal and distinguish the container body 10 corresponding to the light signal.

The conversion module may not be provided if the voltage generated in the second induction coil 201 can be used in the light source module 202 as it is. The conversion module may convert an AC voltage generated in the second induction coil 201 to a DC voltage required by the light source module 202 and supply the converted voltage.

Inside the main body 30, the motor 51 may be provided. The upper end of the motor 51 may be connected to the blade module 14 inside the container body 10.

Figure 5:
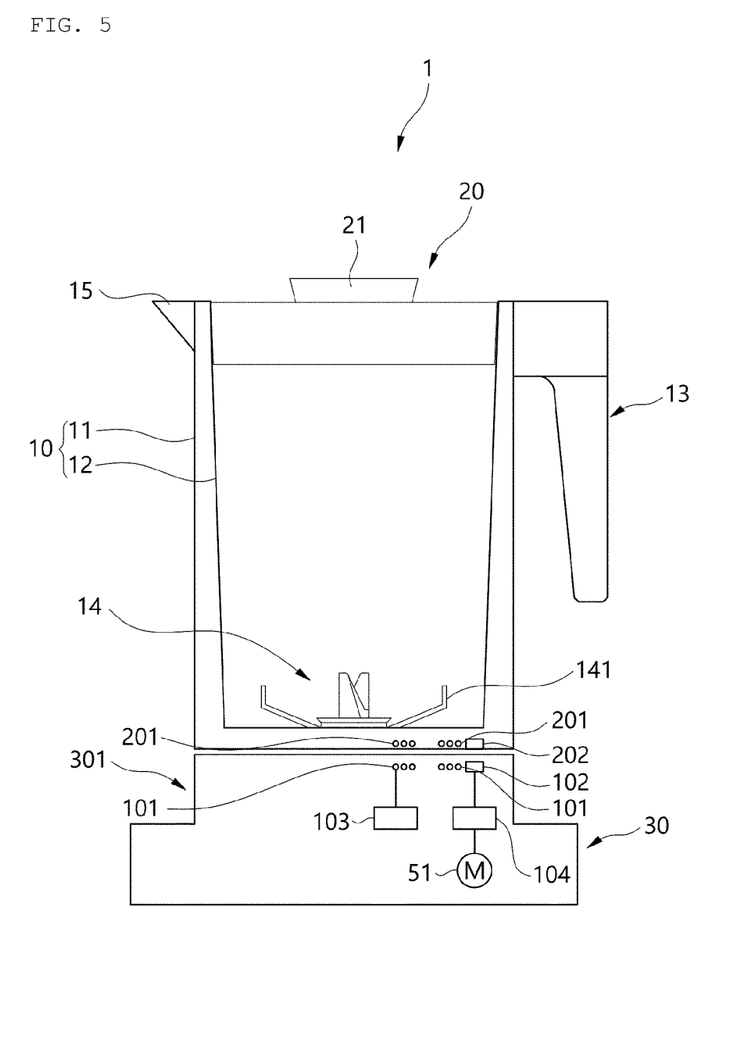
FIG. 5 is a partial sectional view illustrating a part of blender configuration according to another embodiment of the disclosure.
Figure 6:
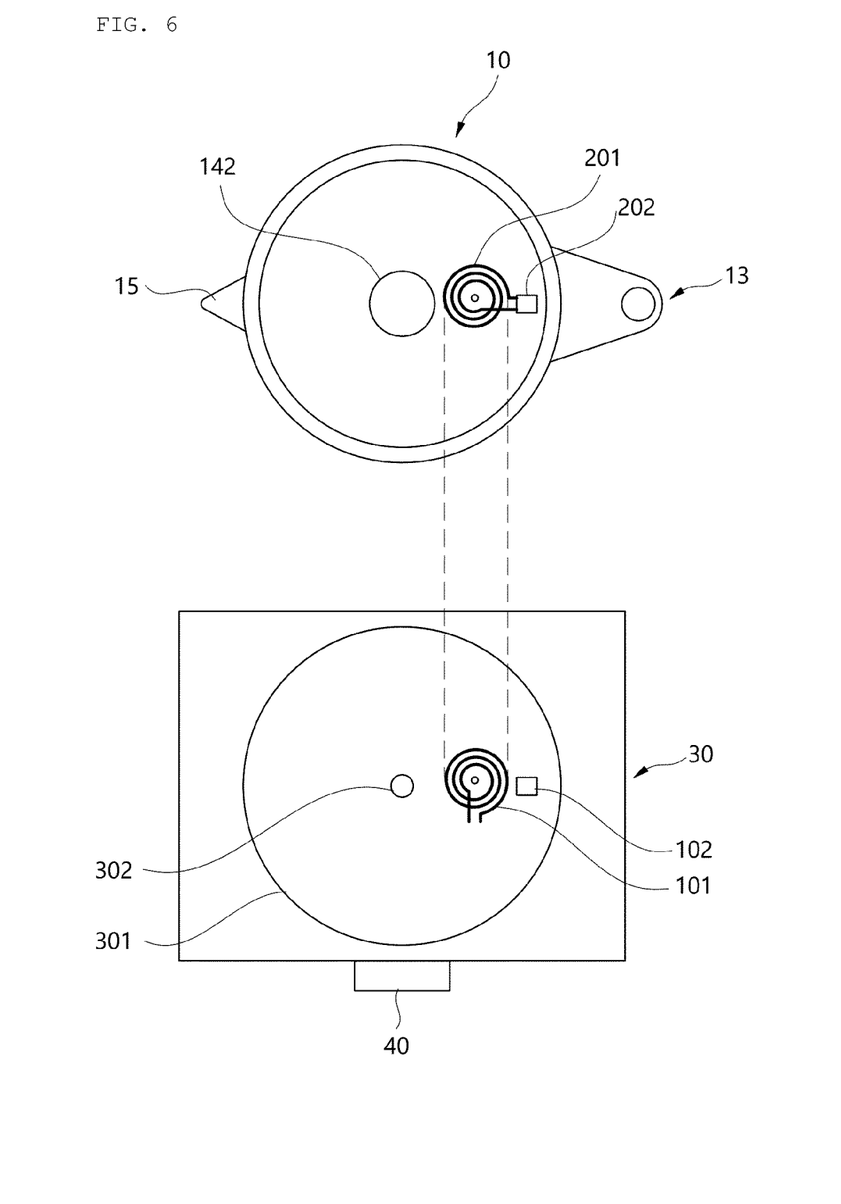
FIG. 6 is a bottom view of a container body and a top view of a main body of the blender of FIG. 5.

FIG. 5 is a partial sectional view illustrating a part of blender configuration according to another embodiment of the disclosure, and FIG. 6 is a bottom view of a container body and a top view of a main body of the blender of FIG. 5.

Referring to FIGS. 5 and 6, in the blender 1 of the embodiment, the first induction coil 101 may be installed at the upper part of the main body 30. The first induction coil 101 may be embodied in a form in which a conductor coil is wound spirally multiple times on the same plane.

Unlike as in FIGS. 3 and 4, the first induction coil 101, according to the embodiment, may be disposed in a form in which a conductor is spirally wound multiple times on one side of a motor-side connection part 302 at the upper central part of the main body 30. The second induction coil 201 may be disposed in a form in which a conductor is spirally wound multiple times on one side of a blade-side connection part 142 at the lower central part of the container body 10.

The first and second induction coils 101 and 201 may be arranged in a form in which their respective conductors are wound spirally multiple times on the same plane.

Also in the embodiment, the first induction coil 101 and the second induction coil 201 may be arranged at predetermined intervals to face each other. Preferably, the first induction coil 101 and the second induction coil 201 may be arranged in order for the inductive coupling between the two coils to be effective.

As for FIGS. 5 and 6, when compared to FIGS. 3 and 4, the only difference is the respective installation location of the first and second induction coils 101 and 201, and the operation of the first induction coil 101, the light reception module 102, the power supply part 103, and the controller 104 of the main body 30, and the operation of the second induction coil 201 and the light source module 202 are the same. Therefore, redundant explanations are omitted.

Figure 7:
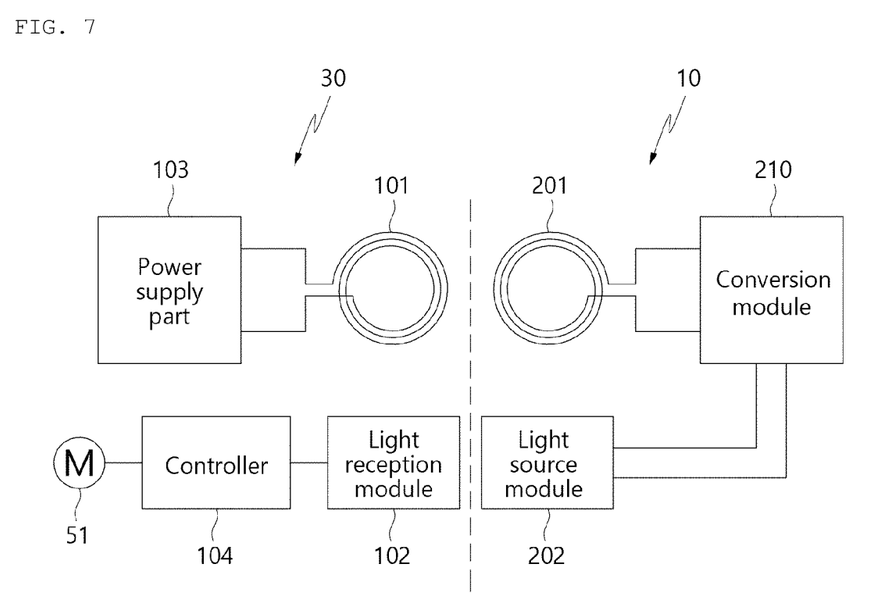
FIG. 7 is an equivalent circuit diagram of the blender according to embodiments of the disclosure.

FIG. 7 is an equivalent circuit diagram of the blender according to embodiments of the disclosure.

Referring to FIG. 7, in the main body 30 of the blender 1 according to the embodiment, the first induction coil 101 may be connected to the power supply part 103 and the light reception module 102 may be connected to the controller 104 and the motor 51.

The power supply part 103 supplies an alternating current to the first induction coil 101, and a magnetic field may be generated around the first induction coil 101 by the supplied alternating current in the first induction coil 101.

The power supply part 103 adjusts the intensity of the alternating current supplied to the first induction coil 101, and thus may induce a change in the magnetic field of the first induction coil 101.

In the container body 10 of the blender 1, the second induction coil 201 may be connected to the light source module 202. The conversion module 210 may be arranged between the second induction coil 201 and the light source module 202 as needed.

The operation in such an equivalent circuit diagram will be described.

The power supply part 103 may apply current to the first induction coil 101, by this current application, a magnetic field may be generated around the first induction coil 101.

The power supply part 103 may alter the size of the current applied to the first induction coil 101, and by the alteration of the current size, the magnetic field may be changed.

When the container body 10 is seated on the upper part of the main body 30, the first induction coil 101 in the main body 30 and the second induction coil 201 in the container body 10 may be placed corresponding to each other.

Here, inductive coupling between the first and second induction coils 101 and 201 occurs, and a voltage may be induced in the second induction coil 201 by the magnetic field generated in the first induction coil 101.

The voltage induced in the second induction coil 201 may be applied to the conversion module 210. The conversion module 210 may convert a voltage induced in the second induction coil 201 to a voltage required by the light source module 202 at the rear end, and output the converted voltage.

The voltage induced in the second induction coil 201 is an AC voltage, so the conversion module 210 may convert this to a DC voltage and output the converted DC voltage. Also, the conversion module 210 may adjust the magnitude of a voltage from the DC voltage converted to the DC voltage required for the light source of the light source module 202.

When the light source module 202 transmits a light signal, the light reception module 102 in the main body 30 may receive the light signal.

The controller 104 may analyze the light signal received by the light reception module 102 and distinguish the container body 10 seated on the main body 30 as described above, meaning it may distinguish the purpose or type of the container body 10.

To this end, the light signal output from the light source module 202 may be set to be distinguished for each container body 10. Thus, the light signal received by the light reception module 102 may be used to distinguish the container body 10.

On the other hand, as described above, the power supply part 103 may apply current to the first induction coil 101 before the container body 10 is seated on the main body 30.

The power supply part 103, however, may apply current to the first induction coil 101 after the container body 10 is seated on the main body 30.

In addition, the conversion module 210 may be provided optionally as needed. The conversion module 210 may not be provided if the light source module 202 generates a light signal using the induced voltage in the second induction coil 201.

In the embodiment, the voltage induced in the second induction coil 201 is an AC voltage and the voltage required by the light source module 202 is a DC voltage, so the conversion module 210 may be provided to convert the AC voltage to the DC voltage and adjust the magnitude of a voltage.

Figure 8:
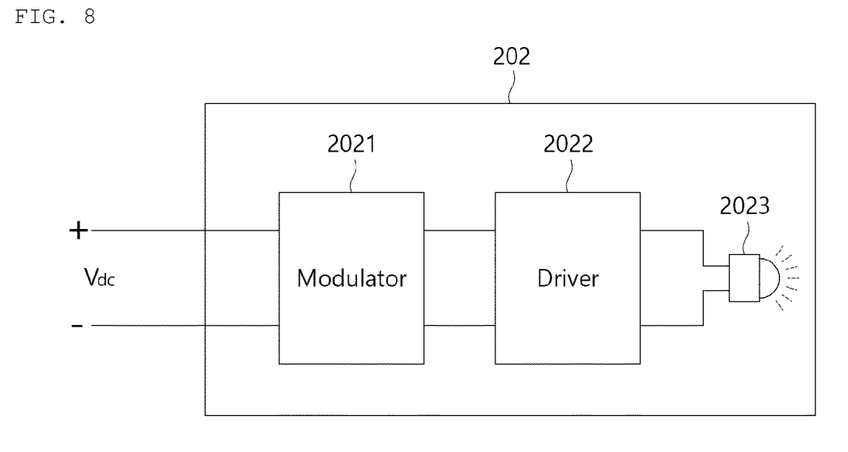
FIG. 8 is a block diagram of a light source module according to embodiments of the disclosure.
Figure 9:
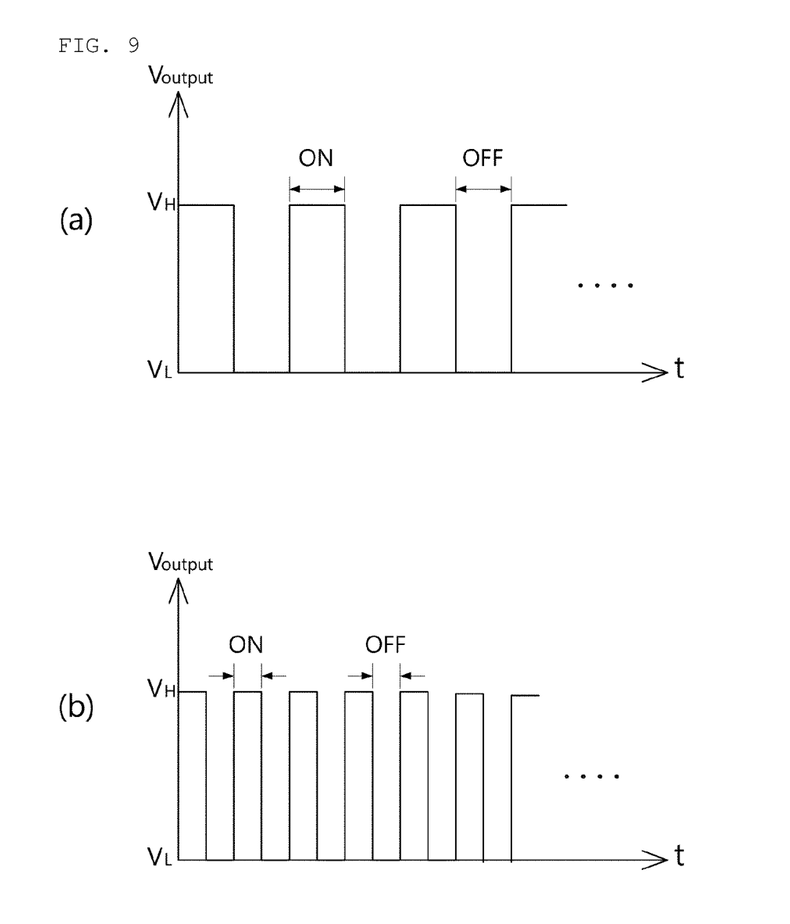
FIG. 9 is a view illustrating a frequency modulation of a light signal in the light source module.

FIG. 8 is a block diagram of a light source module according to embodiments of the disclosure, and FIG. 9 illustrates a frequency modulation of a light signal in the light source module.

The light source module 202 according to the embodiment may include a modulator 2021, a driver 2022, and a light source 2023.

The light source 2023 may emit light. In the embodiment, the light source 2023 may include a light emitting diode (LED), especially an infrared LED.

The on-and-off state of the light source 2023 may be controlled by the driver 2022. When the light source 2023 is in an on state it keeps emitting light, and when the light source 2023 is in an off state it may be turned off without emitting light.

When, by the driver 2022, an on-and-off action is repeated or the action occurs with a constant duty ratio, the light source 2023 may emit and be turned off repeatedly according to the on-and-off action.

The light emitted from the light source 2023 may form a specific light signal according to the frequency being turned on and off.

The modulator 2021 may modulate the frequency of a light signal. This modulation of the frequency of the light signal determines the cycle to turn on and off the light emission.

FIG. 9, for example, illustrates time at which light is turned on and off in the modulator 2021. The frequency of the light signal may be adjusted by adjusting the time at which light is turned on and off. The modulation of the frequency of the light signal may be determined depending on the container body 10.

When the frequency of the light signal is determined in the modulator 2021, the driver 2022 may control on and off of the light source 2023 according to the frequency of the light signal. The light source 2023 may emit light by this on-and-off control.

Accordingly, the light reception module 102 may receive the light emitted at a constant frequency from the light source 2023, and the controller 104 may analyze the received light signal, read the frequency of the light signal, and distinguish the container body 10.

Figure 10:
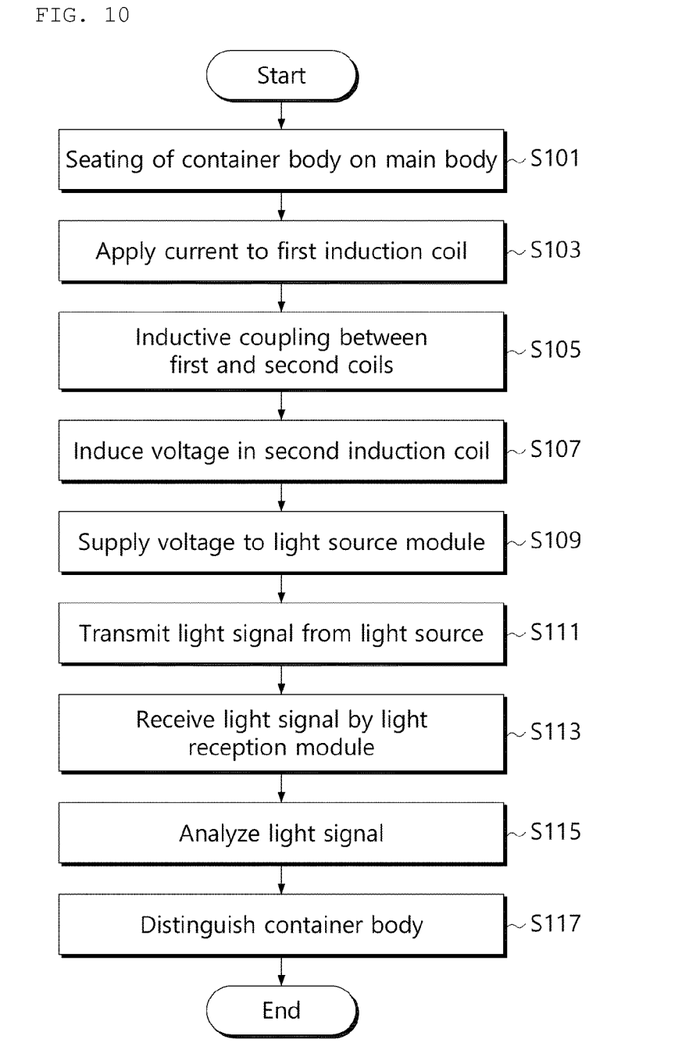
FIG. 10 is a flowchart illustrating the process by which a main body distinguishes a container body according to an embodiment of the disclosure.

FIG. 10 is a flowchart illustrating the process by which a main body distinguishes a container body according to an embodiment of the disclosure.

Referring to FIG. 10, the container body 10 may be seated on the main body 30 in the embodiment.

A seating detection module (not shown) for detecting the seating of the container body 10 on the main body 30 may be arranged in the main body 30.

The seating detection module may detect the magnet attached to the container body 10, so when the container body 10 is seated on the main body 30, the seating detection module may detect the seating of the container body 10 by detecting the magnet and. [S101: seating of container body]

The power supply part 103 may apply a voltage to the first induction coil 101 when the magnet attached to the container body 10 is detected, and may apply an alternating current to the first induction coil 101. The power supply part 103 may also change the magnitude of the current applied to the first induction coil 101.

When an alternating current is applied to the first induction coil 101 or the magnitude of the current is changed, a magnetic field may be generated around the first induction coil 101. [S103: apply current to the first induction coil]

The magnetic field created in the first induction coil 101 may affect the second induction coil 201. With this magnetic field, inductive coupling between the first and second induction coils 101, 201 may occur. [S105: occurring of inductive coupling]

By the inductive coupling, a voltage may be induced in the second induction coil 201. In other words, an induced electromotive force may be generated in the second induction coil 201. [S107: induce voltage in the second induction coil]

The voltage induced in the second induction coil 201 may be supplied to the light source module 202. The light source module 202 does not operate until the voltage is supplied, and it may operate when the voltage is supplied.

When the voltage is supplied to the light source module 202, the light source 2023 inside may transmit a light signal. The light signal may emit light, but this may happen according to the set on and off.

The light signal, in the embodiment, may be set differently for each container body 10. That is, a specific light signal is set for each container body 10 so that the container body 10 may be distinguished by using the light signal. [S109: supply voltage to light source module]

When a light signal is transmitted from the light source 2023 of the light source module 202 installed in the lower part of the container body 10, the light reception module 102 installed in the upper part of the main body 30 may receive the light signal.

When the container body 10 is seated on the main body 30, the light source module 202 and the light reception module 102 may be placed corresponding to each other. [S113: receive light signal by light reception module]

The light reception module 102 may transmit the light signal received from the light source module 202 to the controller 104. The controller 104 may analyze the received light signal.

Since different light signals are set for each container body 10, the container body 10 may be distinguished by analyzing the light signal. [S115: analyze light signal]

Therefore, the controller 104 may distinguish the container body 10 by using the light signal analysis. [S117: distinguish container body]

Further, the controller 104 may drive the motor in an operation mode suitable for the distinguished container body 10.

Figure 11:
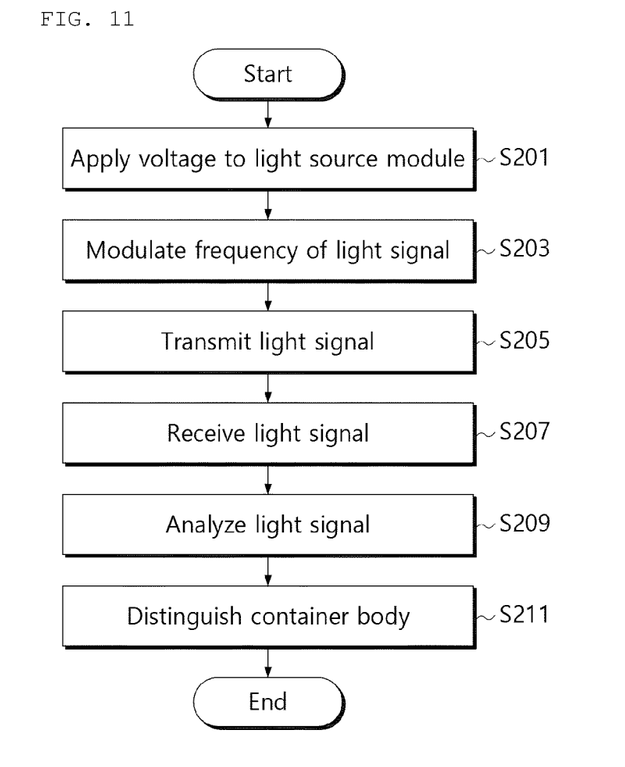
FIG. 11 is a flowchart illustrating the process by which a main body distinguishes a container body according to another embodiment of the disclosure.

FIG. 11 is a flowchart illustrating the process by which a main body distinguishes a container body according to another embodiment of the disclosure.

Referring to FIG. 11, when the first induction coil 101 of the main body 30 and the second induction coil 201 of the container body 10 are inductively coupled, according to the embodiment, a voltage may be induced in the second induction coil 201.

The voltage induced in the second induction coil 201 may be applied to the light source module 102. The light source module 102 may be operated by the applied voltage. [S201: apply voltage to light source module]

When the voltage is applied to the light source module 102, the modulator 2021 of the light source module 102 may modulate the frequency of the light signal. The modulation of the frequency of the light signal may include the process of determining the on-and-off period of light.

This is to determine the period of time for turning on or off the light emitted from the light source 2023, which is to adjust the frequency of the light signal.

The modulation of the frequency is to prevent other light from acting as noise on the light signal generated from the light source 2023 when light is used for other purposes in the blender 1.

In other words, the light signal is modulated with a specific frequency for each container body 10, then by emitting light according to the frequency, it is able to distinguish the container body 10 according to the frequency while at the same time to be distinguished from the noise. [S203: modulate frequency of light signal]

The driver 2022 of the light source module 202 may turn on and off the light source 2023 according to the modulated frequency. Thus the light source 2023 may emit light by this on-and-off control, and the light source module 202 may transmit the frequency-modulated light signal to the outside. [S205: transmit light signal]

When the light source module 202 transmits a light signal, the light reception module 102 in the main body 30 may receive the light signal. The light source module 202 and the light reception module 102 may be placed corresponding to each other.

The light reception module 102 is a device to receive a light signal and may include, for example, a semiconductor sensor. The semiconductor sensor may be implemented as, for example, a photodiode, a phototransistor, or the like. [S207: receive light signal]

The light signal received by the light reception module 102 may be transmitted to the controller 104. The controller 104 may analyze the received light signal. In this light signal analysis, the frequency of the light signal may be read. [S209: analyze light signal]

The frequency of the light signal is set for each container body 10, thus, it is able to distinguish the container body 10 by checking the frequency of the light signal. The controller 104, therefore, may distinguish the container body 10 by using the read frequency. [S211: distinguish container body]

When the container body 10 is distinguished, the main body 30 may operate in the operation mode suitable for the purpose of the container body 10.

Meanwhile, in the embodiment, the frequency of the light signal may be modulated so that the light continues to emit. In other words, the frequency may be modulated so that the light stays on instead of repeating on and off periodically.

Exemplary embodiments of the present disclosure have been described with reference to the accompanying drawings, but the present disclosure is not limited to the exemplary embodiments and may be prepared in various forms, and it will be understood by a person skilled in the art, to which the present invention pertains, that the present disclosure may be practiced in other specific forms without changing the technical idea or essential features thereof. Therefore, the embodiments described herein are illustrative in all aspects and should not be understood as limiting.

The invention claimed is:

1. A blender, comprising:
   a main body having a first induction coil and a light receptor to receive a light signal; and
   a container body having a second induction coil capable of inductively coupling to the first induction coil, and a light emitter to transmit the light signal,
   wherein when the container body is seated on the main body, power is supplied to the light emitter via inductive coupling between the first induction coil and the second induction coil, the light signal is transmitted and received between the light emitter and the light receptor, and the main body distinguishes the container body on the main body by using the light signal received by the light receptor, and
   wherein the controller is configured to determine a frequency of the light signal and distinguishes the container body based on the determined frequency of the light signal.

2. The blender of claim 1, wherein when the container body is seated on the main body, a voltage is induced in the second induction coil via the inductive coupling between the first induction coil and the second induction coil.

3. The blender of claim 2, wherein the light emitter transmits the light signal after being supplied with the induced voltage in the second induction coil.

4. The blender of claim 2, wherein the main body comprises a seating detection part to detect whether the container body is seated, and when the seating detection part detects a magnet attached to the container body, the inductive coupling between the first induction coil and the second induction coil is allowed.

5. The blender of claim 1, wherein the container body comprises a converter to convert an induced voltage in the second induction coil and to apply the converted voltage to the light emitter.

6. The blender of claim 5, wherein the converter converts an alternating current (AC) voltage to a direct current (DC) voltage and to adjust a size of the DC voltage.

7. The blender of claim 1, wherein the light emitter comprises:
   a light source to emit the light signal;
   a modulator to modulate a frequency of the light signal; and a driver configured to turn the light source on and off according to frequency-modulation of the modulator.

8. The blender of claim 1, wherein when the container body is seated on the main body, the first induction coil and the second induction coil are parallel to each other with a same center point.

9. The blender of claim 8, wherein the first induction coil is disposed on a first same plane while being spirally wound multiple times at an outer part from a motor-side connection part at an upper part of the main body, and the second induction coil is disposed on a second same plane while being spirally wound multiple times in at an outer part from a blade-side connection part at a lower part of the container body.

10. The blender of claim 8, wherein the first induction coil is disposed on a first same plane while being spirally wound multiple times at one side of a motor-side connection part at an upper part of the main body, and the second induction coil is disposed on a second same plane while being spirally wound multiple times at one side of a blade-side connection part at a lower part of the container body.

11. The blender of claim 1, wherein the light emitter comprises a light emitting diode (LED) to emit light and the light receptor comprises a semiconductor sensor to receive the light emitted from the LED.

12. The blender of claim 1, comprising a motor, wherein when the light receptor receives the light signal, the motor is operable.

13. The blender of claim 1, wherein the main body comprises a power supply part to apply current to the first induction coil and a controller configured to distinguish the container body by using the light signal received by the light receptor.

14. A method for distinguishing a container body of a blender, the method comprising:
- inductively coupling a first induction coil arranged at an upper part of a main body to a second induction coil arranged at a lower part of the container body when the container body is seated on the main body;
- transmitting a light signal in which a light emitter transmits the light signal after being supplied with a voltage induced in the second induction coil via the inductive coupling;
- receiving the light signal in which a light receptor receives the light signal; and
- distinguishing the container body in which a controller distinguishes the container body being seated by using the received light signal, and
- wherein the controller is configured to determine a frequency of the light signal and distinguishes the container body based on the determined frequency of the light signal.

15. The method for distinguishing the container body of the blender of claim 14, wherein the light emitter in the transmitting the light signal modulates a frequency of the light signal corresponding to the container body, turns the light signal on and off according to the modulated frequency, and transmits the light signal.

16. The method for distinguishing the container of the blender of claim 14, wherein the controller is configured to determine the modulated frequency of the received light signal and distinguish the container body based on the determined modulated frequency.

17. The method for distinguishing the container body of the blender of claim 16, wherein the controller is configured to operate a motor of the main body in an operation mode corresponding to the distinguished container body.

18. A method for distinguishing a container body of a blender, the method comprising:
- detecting a seating of the container body to detect whether the container body is seated on a main body;
- applying a current, when the container body being seated is detected, in which a power supply part applies the current to a first induction coil arranged at an upper part of the main body;
- inductively coupling the first induction coil to a second induction coil arranged at a lower part of the container body by applying the current to the first induction coil;
- transmitting a light signal in which a light emitter transmits the light signal after being supplied with a voltage induced in the second induction coil via the inductive coupling;
- receiving the light signal in which a light receptor receives the light signal; and
- distinguishing the container body in which a controller distinguishes the container body being seated by using the received light signal, and
- wherein the controller is configured to determine a frequency of the light signal and distinguishes the container body based on the determined frequency of the light signal.

19. The method for distinguishing the container body of the blender of claim 18, wherein the light emitter in the transmitting of the light signal modulates a frequency of the light signal corresponding to the container body, turn the light signal on and off according to the modulated frequency, and transmit the light signal, and the controller is configured to determine the modulated frequency of the received light signal and distinguish the container body based on the determined modulated frequency.

* * * * *